(12) United States Patent
Tsai et al.

(10) Patent No.: US 10,795,481 B2
(45) Date of Patent: Oct. 6, 2020

(54) METHOD AND SYSTEM FOR IDENTIFYING TAP EVENTS ON TOUCH PANEL, AND TOUCH-CONTROLLED END PRODUCT

(71) Applicant: Silicon Integrated Systems Corp, Hsinchu (TW)

(72) Inventors: Tsung-Hua Tsai, Hsinchu (TW); Ying-Jyh Yeh, Hsinchu (TW)

(73) Assignee: SILICON INTEGRATED SYSTEMS CORP, Hsinchu (TW)

( * ) Notice: Subject to any disclaimer, the term of this patent is extended or adjusted under 35 U.S.C. 154(b) by 0 days.

(21) Appl. No.: 16/382,702

(22) Filed: Apr. 12, 2019

(65) Prior Publication Data

US 2019/0317633 A1    Oct. 17, 2019

(30) Foreign Application Priority Data

Apr. 13, 2018   (TW) .............. 107112809 A (51) Int. Cl.
*G06F 3/041* (2006.01)
*G06F 3/01* (2006.01)
(Continued)

(52) U.S. Cl.
CPC ............ *G06F 3/0412* (2013.01); *G06F 3/016* (2013.01); *G06F 3/0416* (2013.01); *G06F 3/0488* (2013.01); *G06N 3/02* (2013.01)

(58) Field of Classification Search
CPC ...... G06F 3/0412; G06F 3/016; G06F 3/0488; G06F 3/0416; G06F 3/03547;
(Continued)

(56) References Cited

U.S. PATENT DOCUMENTS

| 7,747,070 B2 | 6/2010 | Puri |
| 8,508,500 B2 | 8/2013 | Chang et al. |

(Continued)

FOREIGN PATENT DOCUMENTS

| CN | 101253493 A | 8/2008 |
| TW | 201113769 A | 4/2011 |
| TW | 201232345 A1 | 8/2012 |

OTHER PUBLICATIONS

Texas Instruments, SimpleLinkTM CC3100/CC3200 Wi-Fi Internet-on-a-chipTM Networking Sub-system Power management, Application Report, SWRA462, Sep. 2014.

*Primary Examiner* — Premal R Patel
(74) *Attorney, Agent, or Firm* — Muncy, Geissler, Olds & Lowe, P.C.

(57) ABSTRACT

A method for identifying tap events on a touch panel includes measuring vibration signals for tap events on the touch panel to collect the tap events and record types of the tap events as samples; generating a sample set including a plurality of samples; using the sample set to train a deep neural network to determine an optimized weighting parameter group; taking the deep neural network and the optimized weighting parameter group as a tapping classifier and deploying it to a touch-controlled end product; and obtaining a predicted tap type based on a vibration signal and an image formed by touch sensing values detected by the touch-controlled end product to which a tap operation is performed. The present disclosure also provides a system corresponding to the identifying method, and a touch-controlled end product.

20 Claims, 9 Drawing Sheets

(51) Int. Cl.
*G06F 3/0488* (2013.01)
*G06N 3/02* (2006.01)
(58) Field of Classification Search
CPC .... G06F 3/04883; G06F 3/0446; G06F 3/044; G06N 3/02
See application file for complete search history.

(56) References Cited

U.S. PATENT DOCUMENTS

2015/0035759 A1* 2/2015 Harrison ............... G06F 3/0416
345/173
2016/0026261 A1 1/2016 Cheng et al.
2018/0059797 A1* 3/2018 Lopez Meyer ......... G06F 3/017

* cited by examiner

METHOD AND SYSTEM FOR IDENTIFYING TAP EVENTS ON TOUCH PANEL, AND TOUCH-CONTROLLED END PRODUCT

BACKGROUND

1. Field of Disclosure

The present disclosure relates to sensing technologies, and more particularly to a method and system for identifying tap events on a touch panel, and a touch-controlled end product.

2. Description of Related Art

Existing large-sized touch display devices are equipped with marking and drawing software for users to mark on display screens to illustrate the content shown on the screens. The marking and drawing software usually has a main menu displayed on an edge of the screen. By way of the main menu, the users can adjust a brush color or a brush size. However, the size of the screen is quite large. The main menu may be distanced away from a user. It is very inconvenient for the user to click on the main menu. It is pretty troubling for the user to adjust brush properties.

Therefore, there is a need to provide a new solution to solve above problems.

SUMMARY

An objective of the present disclosure is to provide a method and system for identifying tap events on a touch panel, and a touch-controlled end product, for improving accuracy of predictions on tap types.

To achieve above objective, an aspect of the present disclosure provides a method for identifying tap events on a touch panel, including:

detecting various tap events on the touch panel to obtain a plurality of measured vibration signals and recording types of the tap events as classification labels; taking the vibration signal and the classification label that correspond to one of the tap events as a sample, and generating a sample set including a plurality of samples; taking the samples of the sample set as inputs and a freely-selected weighting parameter group as adjusting parameters and inputting them into a deep neural network for training the deep neural network by adjusting the weighting parameter group by way of a backpropagation algorithm; taking out the samples of the sample set in batches to train the deep neural network and fine tune the weighting parameter group to determine an optimized weighting parameter group; taking the deep neural network and the optimized weighting parameter group as a model and deploying the model to a touch-controlled end product; detecting a vibration signal generated by a tap operation performed to the touch-controlled end product and generating an image formed by a plurality of touch sensing values corresponding to the tap operation; and inputting the vibration signal corresponding to the tap operation into the model to obtain a first result and analyzing the image formed by the touch sensing values to obtain a second result, and obtaining a predicted tap type based on the first result and the second result.

Another aspect of the present disclosure provides a method for identifying tap events on a touch panel, including: detecting various tap events on the touch panel to obtain a plurality of measured vibration signals, using the touch panel to detect each of the tap events to obtain a plurality of touch sensing values and transforming the touch sensing values into an image, and recording types of the tap events as classification labels; taking the vibration signal, the image, and the classification label that correspond to one of the tap events as a sample, and generating a sample set including a plurality of samples; taking the samples of the sample set as inputs and a freely-selected weighting parameter group as adjusting parameters and inputting them into a deep neural network for training the deep neural network by adjusting the weighting parameter group by way of a backpropagation algorithm; and taking out the samples of the sample set in batches to train the deep neural network and fine tune the weighting parameter group to determine an optimized weighting parameter group.

Still another aspect of the present disclosure provides a system for identifying tap events on a touch panel, including: a touch panel; a vibration sensor, deployed with the touch panel, wherein the vibration sensor is configured to detect various tap events on the touch panel to obtain a plurality of measured vibration signals, and the touch panel is configured to detect each of the tap events to obtain a plurality of touch sensing values and the touch sensing values are transformed into an image; a processor coupled to the vibration sensor and the touch panel, configured to receive the vibration signals transmitted from the vibration sensor and a plurality of images transmitted from the touch panel; and a memory, connected to the processor, the memory including a plurality of program instructions executable by the processor, the processor executing the program instructions to perform a method including: recording types of the tap events as classification labels in the memory; taking the vibration signal, the image, and the classification label that correspond to one of the tap events as a sample, and generating a sample set including a plurality of samples; taking the samples of the sample set as inputs and a freely-selected weighting parameter group as adjusting parameters and inputting them into a deep neural network for training the deep neural network by adjusting the weighting parameter group by way of a backpropagation algorithm; and taking out the samples of the sample set in batches to train the deep neural network and fine tune the weighting parameter group to determine an optimized weighting parameter group.

Yet another aspect of the present disclosure provides a touch-controlled end product, including: a touch interface; a vibration sensor, deployed with the touch interface, the vibration sensor configured to detect a vibration signal generated by a tap operation performed to the touch interface configured to sense the tap operation to obtain a plurality of touch sensing values which are then transformed into an image; and a controller coupled to the vibration sensor and the touch interface, wherein a deep neural network corresponding to the deep neural network according to the afore-mentioned methods is deployed in the controller, and the controller is configured to take the corresponding deep neural network and the optimized weighting parameter group obtained according to the afore-mentioned methods as a model and input the vibration signal corresponding to the tap operation and the image from the touch interface into the model to obtain a predicted tap type.

In the present disclosure, deep learning with the deep neural network is adopted to classify various tap events on the touch panel to obtain a prediction model. The prediction model is deployed in the touch-controlled end product. Accordingly, the touch-controlled end product can predict types of tap motions made by users, and carry out various applications for these tap types in software applications and thus greatly improve applicability. In addition, the vibration signal and the image formed by the touch sensing values that are generated due to the tap are used together to predict tap type in the present disclosure, thereby effectively improving accuracy of prediction on the tap type.

DETAILED DESCRIPTION OF PREFERRED EMBODIMENTS

To make the objectives, technical schemes, and technical effects of the present disclosure more clearly and definitely, the present disclosure will be described in details below by using embodiments in conjunction with the appending drawings. It should be understood that the specific embodiments described herein are merely for explaining the present disclosure, and as used herein, the term "embodiment" refers to an instance, an example, or an illustration but is not intended to limit the present disclosure. In addition, the articles "a" and "an" as used in the specification and the appended claims should generally be construed to mean "one or more" unless specified otherwise or clear from the context to be directed to a singular form.

In the present disclosure, deep learning is utilized to learn to classify tap events on a touch panel to obtain a classification model. By use of the classification model, tap motions made by users on touch-controlled products can be classified to yield tap types (e.g., the number of taps, the number of fingers performing a tap, a combination of them, and the likes. In such a way, predetermined operations can be performed corresponding to the tap types.

Particularly, vibration signals measured by a vibration sensor and images of touch sensing values measured by a touch panel are used together to predict the tap types in the present disclosure, thereby effectively improving accuracy of predictions on the tap types.

For example, the types of tap events can be classified by a portion of a finger conducting the tap (such as taps using the pulp, knuckle, and nail of the finger), the number of taps (such as a one-time tap, a two-time tap, and a three-time tap), the number of fingers simultaneously conducting a tap (such as taps using one, two, and three fingers), a tapping angle (such as a 90-degree tap and a 45-degree tap), or any combination of them.

The predetermined operations may be configured based on different application scenarios. For example, for a large-sized touch panel, a tap using one single finger may correlate to an operation of opening or closing a menu, a tap using two fingers may correlate to an operation of changing a brush color, and a tap using three fingers may correlate to an operation of changing a brush size. As described below, a person skilled in the art can understood that the inventive concepts of the present disclosure can be applied to other aspects. Of course, relations between the tap types and the operations to be performed can be defined by users themselves.

Figure 1:
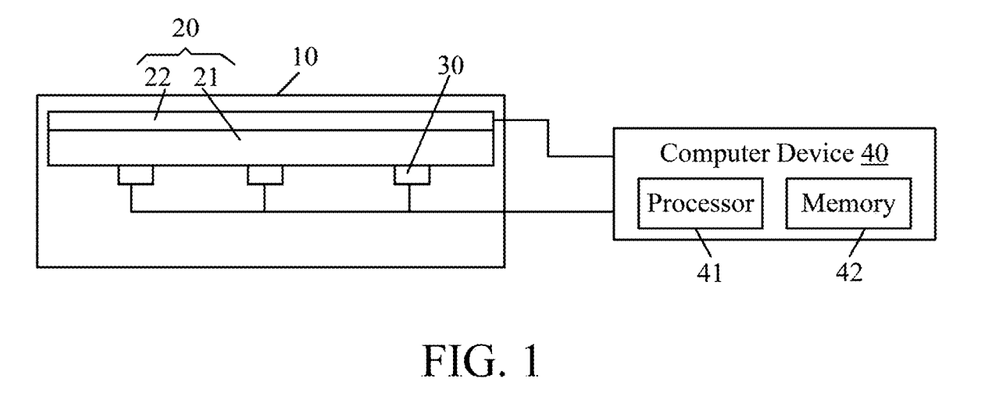
FIG. 1 is a schematic diagram illustrating a system for identifying tap events on a touch panel according to the present disclosure.

FIG. 1 is a schematic diagram illustrating a system for identifying tap events on a touch panel according to the present disclosure. The system includes a touch control device 10 and a computer device 40 coupled to the touch control device 10. The touch control device 10 includes a touch panel 20 and at least one vibration sensor 30. The touch control device 10 can be a display device having a touch control function, and can display images by way of a display panel (not shown) and receive touch control operations made by users. The computer device 40 can be a computer having a certain degree of computing ability, such as a personal computer, a notebook computer, and so on. In the present disclosure, in order to classify the tap events, it first needs to collect the tap events. In this regard, taps on the touch control device 10 are manually made. Signals corresponding to the tap events are transmitted to the computer device 40. The computer device 40 proceeds with learning using a deep neural network.

The vibration sensor 30 is an accelerometer, for example. The vibration sensor 30 can be arranged at any position of the touch control device 10. Preferably, the vibration sensor 30 is disposed on a bottom surface of the touch panel 20. The vibration sensor 30 is configured to detect tap motions made to the touch control device 10 to generate corresponding vibration signals. In a situation that the vibration sensor 30 is disposed on the bottom surface of the touch panel 20, the taps on the touch panel 20 may generate better signals.

The touch panel 20 includes a signal transmitting (Tx) layer 21 and a signal receiving (Rx) layer 22. The touch panel 20 detects user touch operations to generate a plurality of touch sensing values (such as capacitance). A location to where a touch is made can be determined from these touch sensing values. These touch sensing values together with their coordinates (such as coordinates on X and Y axes) can be deemed as an image. The touch sensing values correspond to pixel values of the image. The distribution of the touch sensing values of the image corresponds to a profile of the tap.

In an embodiment, the computer device 40 receives the vibration signals generated by the vibration sensor 30, via a connection port, and feeds the signals into the deep neural network for classification learning. After the tap events are manually produced, the type of each of the tap events can serve as a classification label which is inputted to the computer device 40 for supervised learning.

In another embodiment, the computer device 40 receives the vibration signals generated by the vibration sensor 30 and the touch sensing values from the touch panel 20, via a connection port. The computer device 40 may transform the touch sensing values from the touch panel 20 into data in a form consistent with image data, and then the vibration signal and the image are fed into the deep neural network for classification learning.

That is, before prediction on the tap types, it can take the vibration signals generated by the tap events and the classification labels corresponding to the types of tap events as inputs to train the deep neural network, and it can also take the vibration signals generated by the tap events, the image signals (from the touch panel 20), and the classification labels corresponding to the types of tap events as inputs to train the deep neural network.

As shown in FIG. 1, the computer device 40 includes a processor 41 and a memory 42. The processor 41 is coupled to the vibration sensor 30. The processor 41 receives the vibration signals transmitted from the vibration sensor 30. The memory 42 is connected to the processor 41. The memory 42 includes a plurality of program instructions executable by the processor 41. The processor 41 executes the program instructions to perform calculations relating to the deep neural network. The computer device 40 may adopt GPU to perform the computations relating to the deep neural network for improving computational speed.

Figure 2:
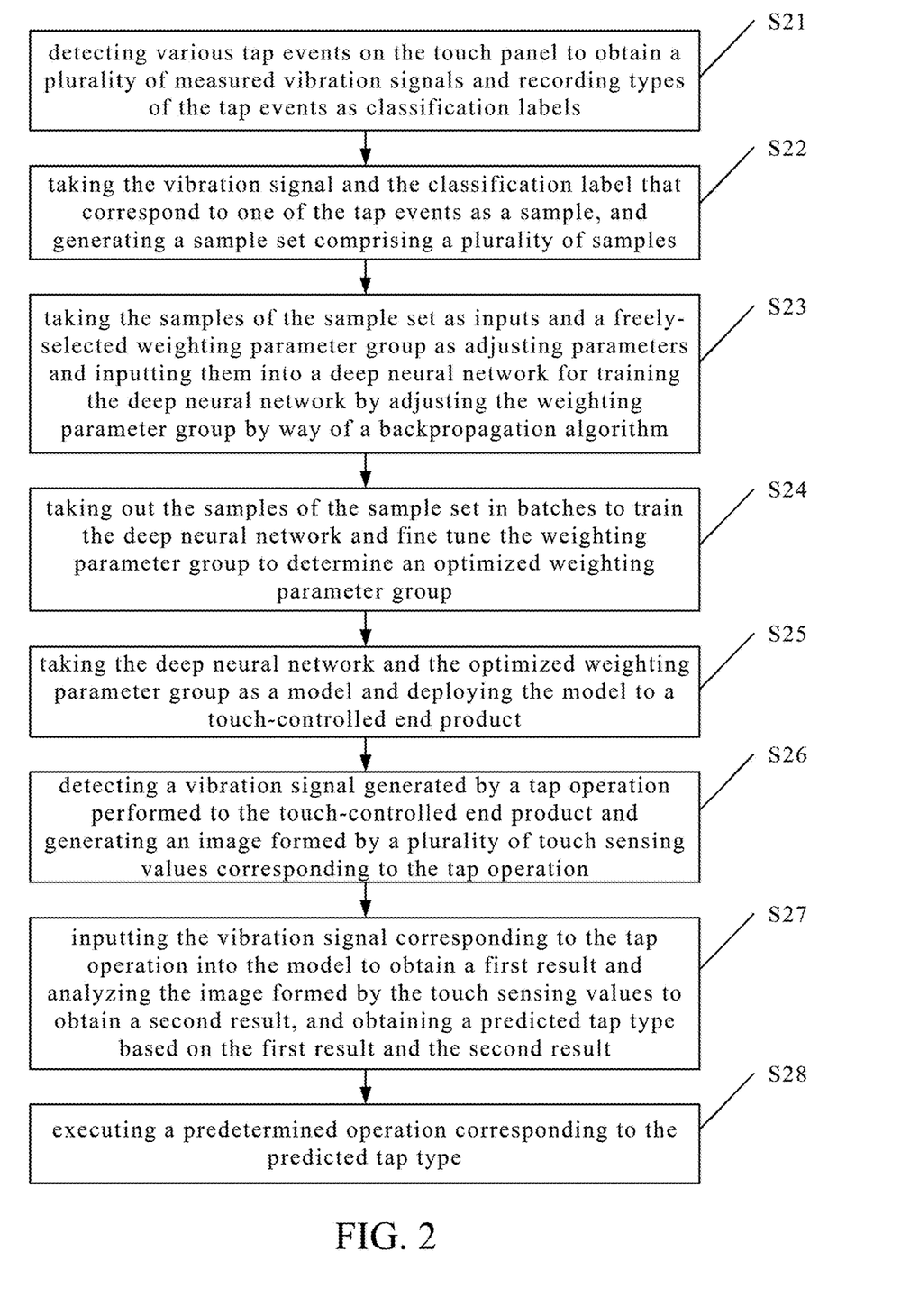
FIG. 2 is a flowchart of a method for identifying tap events on a touch panel according to a first embodiment of the present disclosure.

FIG. 2 is a flowchart of a method for identifying tap events on a touch panel according to a first embodiment of the present disclosure. Referring to FIG. 2 with reference to FIG. 1, the method includes the following steps.

Step S21—using the vibration sensor 30 to detect various tap events on the touch panel 20 to obtain a plurality of measured vibration signals and recording types of the tap events as classification labels. In this step, various types of tap events on the touch panel 20 are manually produced. The vibration sensor 20 disposed on the bottom surface of the touch panel 30 generates vibration signals by detecting the tap events. In addition, the classification labels corresponding to the types of tap events are recorded and are stored in the memory 42.

In the present disclosure, the number of the vibration sensors 30 is not restricted to one entity. A plurality of the vibration sensors 30 may be deployed. The vibration sensor 30 can also be disposed at any position of the touch control device 10. The vibration sensor 30 can detect a tap motion made at any position of the surface of the touch control device 10.

Figure 3:
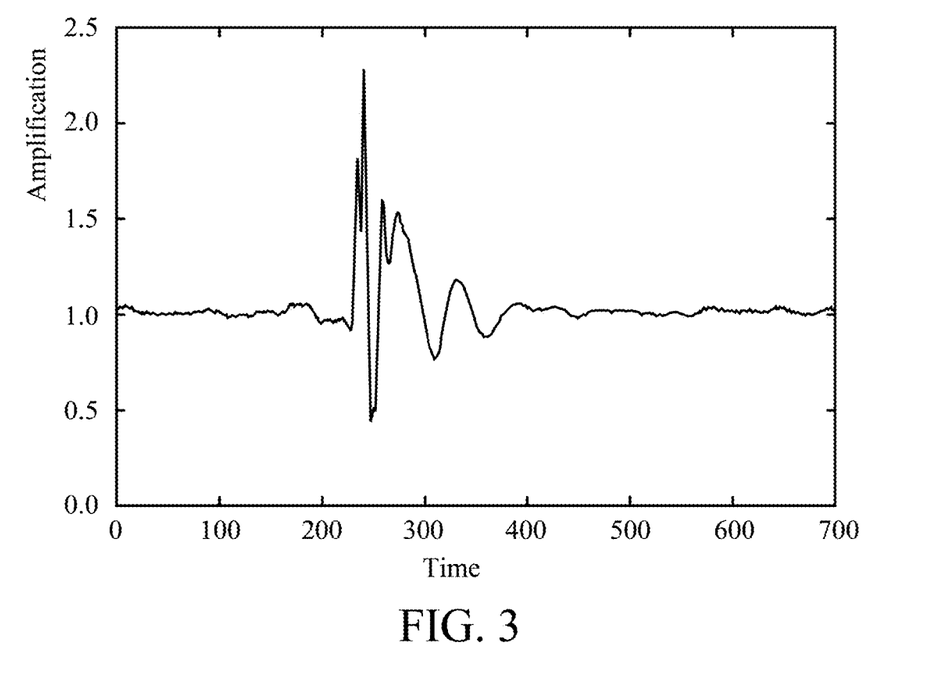
FIG. 3 is a schematic diagram illustrating a vibration signal in a time distribution form according to the present disclosure.
Figure 4:
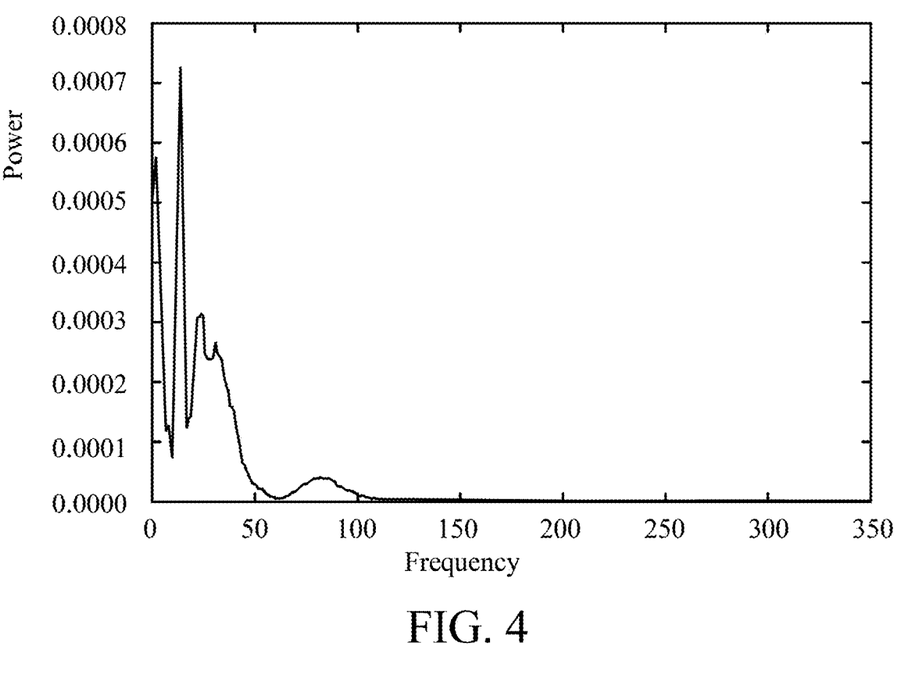
FIG. 4 is a schematic diagram illustrating a vibration signal in frequency space according to the present disclosure.

The acceleration measured by the vibration sensor 30 is a function of time and has three directional components. FIG. 3 illustrates time distribution of an acceleration signal corresponding to a certain tap event. In an embodiment, Fourier transform can be utilized to convert the three directional components to frequency space, as shown in FIG. 4. Specifically, the method may further include a step of converting each of the vibration signals from time distribution to frequency space (or from a time domain to a frequency domain).

After converting to the frequency domain, low-frequency DC components and high-frequency noise signals may be further filtered and removed in order to prevent classification results from being affected by the gravitational acceleration and the noise signals. Specifically, the method may further include a step of filtering each of the vibration signals to remove portions of high frequencies and low frequencies.

Step S22—taking the vibration signal and the classification label that correspond to one of the tap events as a sample, and generating a sample set including a plurality of samples. In this step, one vibration signal measured by the vibration sensor 30 and the classification label corresponding to the type of a tap event corresponding to the one vibration signal serve as a record, that is, a sample. A sample set consists of a plurality of samples. Specifically, a sample includes feature values of one vibration signal and a classification label corresponding the type of a tap event corresponding to the one vibration signal.

The sample set can be divided into a training sample set and a test sample set. The training sample set can be used to train the deep neural network. The test sample set is used to test a trained deep neural network to yield accuracy of the classification.

Step S23—taking the samples of the sample set as inputs and a freely-selected weighting parameter group as adjusting parameters and inputting them into a deep neural network for training the deep neural network by adjusting the weighting parameter group by way of a backpropagation algorithm.

Figure 5:
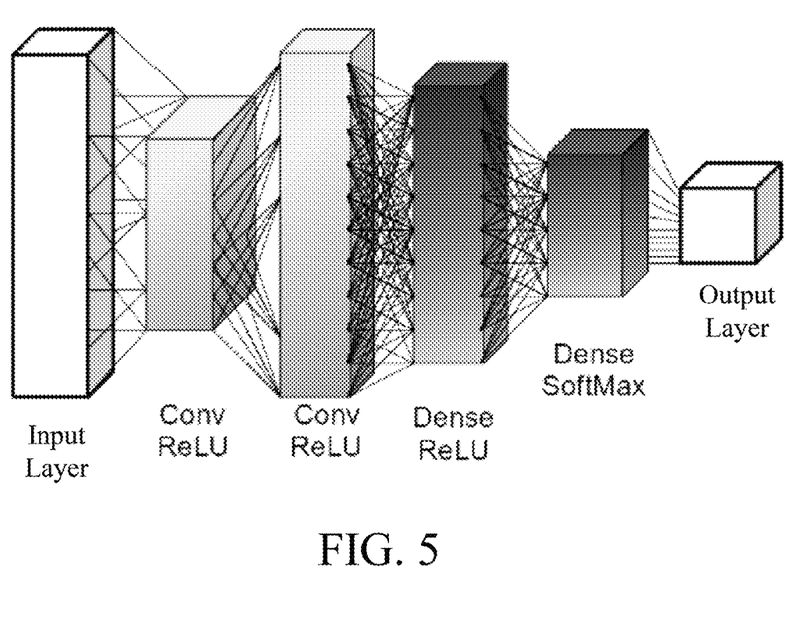
FIG. 5 is a schematic diagram illustrating a deep neural network according to the present disclosure.

The feature values of one sample obtained from Step S22 is inputted to the deep neural network via an input layer. The deep neural network outputs a predicted classification label. FIG. 5 illustrates an example of deep neural network. The deep neural network generally includes the input layer, an output layer, and learning layers between the input layer and the output layer. Each sample of the sample set is inputted from the input layer and the predicted classification label is outputted from the output layer. Generally speaking, the deep neural network includes a plurality of learning layers. The number of the learning layers (e.g., 50-100 layers) is quite large, thereby achieving deep learning. The deep neural network shown in FIG. 5 is only an example, and the deep neural network of the present disclosure is not limited thereto.

The deep neural network may include a plurality of convolutional layers, batch normalization layers, pooling layers, fully-connected layers, and rectified linear units (ReLu), and a Softmax output layer. The present disclosure may adopt an appropriate number of layers for the learning to compromise the prediction accuracy and the computational efficiency. It is noted that a use of too many layers may decrease the accuracy. The deep neural network may include a plurality of cascaded sub networks for improving the prediction accuracy. Each of the sub networks is connected to subsequent sub networks, for example, Dense Convolutional Network (DenseNet). The deep neural network may include residual networks for solving a degradation problem.

Optimization of the deep neural network aims at minimizing a classification loss. A backpropagation algorithm may be adopted for the optimization. That is, a predicted result obtained from the output layer is compared to an actual value to get an error, which is propagated backward layer by layer to calibrate parameters of each layer.

Step S24—taking out the samples of the sample set in batches (mini-batches) to train the deep neural network and fine tune the weighting parameter group to determine an optimized weighting parameter group. The weighting parameter group is fine tune a little bit every time a sub sample set (a batch) is used for the training. Such a process is iterately performed until the classification loss converges. Finally, a parameter group carrying out the highest prediction accuracy for the test sample set is selected and serves as an optimized parameter group for the model.

Step S25—taking the deep neural network and the optimized weighting parameter group as a model and deploying the model to a touch-controlled end product. In this step, the touch-controlled end product has a prediction model, which includes a deep neural network identical to or corresponding to the deep neural network adopted in Steps S24 to S26 and the optimized weighting parameter group obtained from Step S24.

Step S26—detecting a vibration signal generated by a tap operation performed to the touch-controlled end product and generating an image formed by a plurality of touch sensing values corresponding to the tap operation. The touch-controlled end product includes a touch interface and at least one vibration sensor. In this step, when a user taps the touch-controlled end product, the vibration sensor in the touch-controlled end product measures the vibration signal and the touch interface detects user touch operations to generate a plurality of touch sensing values (such as capacitance). These touch sensing values are transformed into an image. The distribution of the touch sensing values of the image corresponds to a profile of the tap.

Step S27—inputting the vibration signal corresponding to the tap operation into the model to obtain a first result and analyzing the image formed by the touch sensing values to obtain a second result, and obtaining a predicted tap type based on the first result and the second result. That is, prediction on the tap types is achieved based on the vibration signal generated by the vibration sensor of the touch-controlled end product and the image formed by the touch sensing values generated by the touch interface of the touch-controlled end product. The vibration signal from the touch-controlled end product serves as an input of the trained deep neural network to obtain a first predicted result for the tap type. The image formed due to a touch operation and obtained from the touch-controlled end product is analyzed to obtain a second predicted result for the tap type. Both of the first predicted result and the second predicted result participate the final prediction on the tap type.

In an embodiment, assuming that one of the first predicted result and the second predicted result is uncertain or cannot be determined, the final prediction on the tap type can determined by the other predicted result. In another embodiment, the final prediction on the tap type can be one of the first predicted result and the second predicted result. For example, when the first predicted result and the second predicted result are not consistent with each other, one of them can be preselected as a final predicted result or the final predicted result may be determined according to scores of the first predicted result and the second predicted result. In still another embodiment, the final prediction on the tap type can be a combination of predicted tap types obtained from the first predicted result and the second predicted result.

For example, the number of taps (e.g., a two-time tap) can be obtained from the vibration signal by the model and how many fingers simultaneously conduct a tap (e.g., a tap using two fingers) can be analyzed from the image. Accordingly, the predicted tap type can be determined to be a two-time tap using two fingers. For example, the number of taps (e.g., a two-time tap) can be obtained from the vibration signal by the model and which portion of a finger conducts a tap (e.g., a tap using the knuckle of the finger) can be analyzed from the image. Accordingly, the predicted tap type can be determined to be a two-time tap using the knuckle.

Step S28 executing a predetermined operation corresponding to the predicted tap type. In this step, the predicted tap type can be transmitted to a software application running in an operating system and the software application can perform an operation corresponding to the predicted result.

Figure 6:
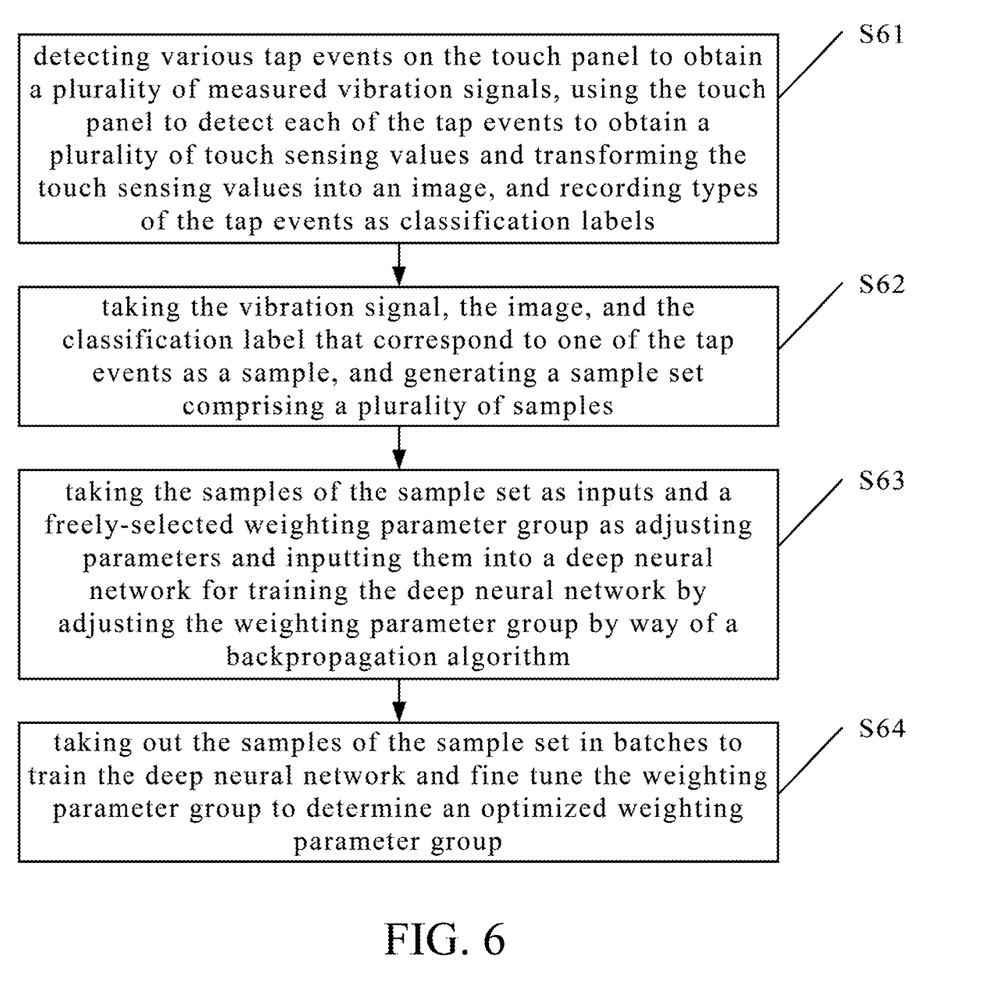
FIG. 6 is a flowchart of a method for identifying tap events on a touch panel according to a second embodiment of the present disclosure.

FIG. 6 is a flowchart of a method for identifying tap events on a touch panel according to a second embodiment of the present disclosure. Referring to FIG. 6 with reference to FIG. 1, the method includes the following steps.

Step S61—using the vibration sensor 30 to detect various tap events on the touch panel 20 to obtain a plurality of measured vibration signals, using the touch panel 20 to detect each of the tap events to obtain a plurality of touch sensing values and transforming the touch sensing values into an image, and recording types of the tap events as classification labels. In this step, various types of tap events on the touch panel 20 are manually produced. The vibration sensor 20 disposed on the bottom surface of the touch panel 30 generates vibration signals by detecting the tap events. For each of the tap events, the touch panel 20 generates the plurality of touch sensing values. These touch sensing values are transformed into data in a form of an image data. A tap event corresponds to an image. In addition, the classification labels corresponding to the types of tap events are recorded and are stored in the memory 42.

In the present disclosure, the image of touch sensing values can be generated by the touch panel 20 and then inputted to the computer device 40. The touch sensing values from touch panel 20 can also be transformed into the image using the processor 41 of the computer device 40.

Generally, the tap event is occurred only on a local area on the touch panel 20. Accordingly, touch sensing values in this area can only be extracted to form the image. That is, it can adopt only the image corresponding to the local area to train the deep neural network. Specifically, the method may further include a step of transforming the touch sensing values which correspond to a local area where the tap event is located at, into the image.

Step S62—taking the vibration signal, the image, and the classification label that correspond to one of the tap events as a sample, and generating a sample set including a plurality of samples. In this step, one vibration signal measured by the vibration sensor 30, the image of the touch sensing values from the touch panel 20, and the classification label corresponding to the type of a tap event corresponding to the one vibration signal serve as a record, that is, a sample. A sample set consists of a plurality of samples. Specifically, a sample includes feature values of one vibration signal, feature values of the image, and a classification label corresponding the type of a tap event corresponding to the one vibration signal.

The sample set can be divided into a training sample set and a test sample set. The training sample set can be used to train the deep neural network. The test sample set is used to test a trained deep neural network to yield accuracy of the classification.

Step S63—taking the samples of the sample set as inputs and a freely-selected weighting parameter group as adjusting parameters and inputting them into a deep neural network for training the deep neural network by adjusting the weighting parameter group by way of a backpropagation algorithm.

Figure 7:
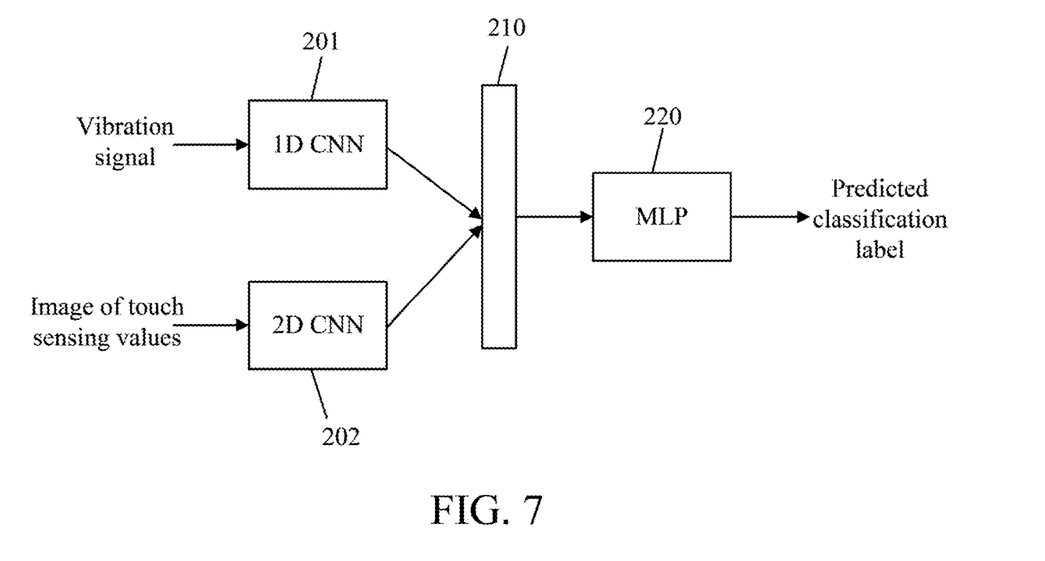
FIG. 7 is a schematic diagram illustrating a framework of a deep neural network according to the present disclosure.

FIG. 7 is a schematic diagram illustrating a framework of a deep neural network according to the present disclosure. In this step, each of the samples of the sample set is inputted to the deep neural network shown in FIG. 7 for the training.

As shown in FIG. 7, the deep neural network includes a first sub network 201, a second sub network 202, a flat layer 210, and a multi-layer perceptron 220. The vibration signal from the vibration sensor 30 is inputted to the first sub network 201. The image of the touch sensing values from the touch panel 20 is inputted to the second sub network 202. The first sub network 201 and the second sub network 202 are parallel structures in the deep neural network. The vibration signal is of one-dimensional data. The first sub network 201 may be implemented by a one-dimensional framework such as a one-dimensional convolutional neural network (CNN). The image of the touch sensing values is of two-dimensional data. The second sub network 202 may be implemented by a two-dimensional framework such as a two-dimensional CNN. The output of the first sub network 201 and the output of the second sub network 202 are inputted to the flat layer 210 for data flattening. Since the first sub network 201 is the one-dimensional framework and the second sub network 202 is the two-dimensional framework, it needs to use the flat layer 210 to transform the outputs of the first sub network 201 and the second sub network 202 into one-dimensional data. The output of the flat layer 210 is then inputted to the multi-layer perceptron 220 to perform classification prediction for the tap events to obtain a predicted classification label. The multi-layer perceptron 220 may be deemed as another sub network of the deep neural network, which consists of a plurality of node layers and maps a group of input vectors into a group of output vectors. Except for input nodes, each node is a neuron having a non-linear activation function. The multi-layer perceptron 220 may include convolutional layers, ReLU layers, pooling layers, and fully-connected layers. Each neuron of the first sub network 201, the second sub network 202, and the multi-layer perceptron 220 corresponds to a weighting value. All of the weighting values of the deep neural network construct the weighting parameter group.

For example, the multi-layer perceptron 220 consists of an input layer, one or more hidden layers, and an output layer. Each input value inputted from the flat layer 210 to the multi-layer perceptron 220 is inputted via the input layer. Each input value is multiplied by a weighting value and the results are then added up (a bias may be added to the sum), serving as a value of a neuron of a first hidden layer. The value may be then non-linearly transformed to obtain a final value, serving as an input of a next hidden layer. In such a way, the output layer outputs a predicted result, i.e., the predicted classification label.

Specifically, Step S63 may include the following steps.

inputting features of the vibration signal corresponding to one of the tap events into a one-dimensional first sub network 201;

inputting features of the image corresponding to the touch sensing values of one of the tap events into a two-dimensional second sub network 202;

inputting an output of the first sub network 201 and an output of the second sub network 202 into a flat layer 210 for data flattening to transform the outputs of the first sub network 201 and the second sub network 202 into one-dimensional data; and inputting an output of the flat layer 210 to a multi-layer perceptron 220 to perform classification prediction for the tap events to obtain a predicted classification label.

Optimization of the deep neural network aims at minimizing a classification loss. A backpropagation algorithm may be adopted for the optimization. That is, a predicted result obtained from the output layer is compared to an actual value to get an error, which is propagated backward layer by layer to calibrate parameters of each layer. Specifically, the method may further include a step of adjusting the weighting parameter group by way of a backpropagation algorithm based on an error lying between the predicted classification label and a classification label of the sample. The backpropagation algorithm can adjust not only the weightings of neurons of the multi-layer perceptron 220, but also the weightings of neurons of the first sub network 201 and the second sub network 202.

Step S64—taking out the samples of the sample set in batches to train the deep neural network and fine tune the weighting parameter group to determine an optimized weighting parameter group. The weighting parameter group is fine tune a little bit every time a sub sample set (a batch) is used for the training. Such a process is iteratedly performed until the classification loss converges. Finally, a parameter group carrying out the highest prediction accuracy for the test sample set is selected and serves as an optimized parameter group for the model.

Figure 8:
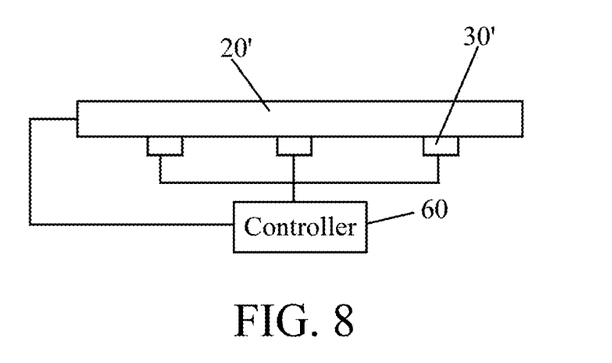
FIG. 8 is a schematic diagram illustrating a touch-controlled end product according to the present disclosure.

FIG. 8 is a schematic diagram illustrating a touch-controlled end product according to the present disclosure. As shown in FIG. 8, the touch-controlled end product includes a touch interface 20', one or more vibration sensor 30', and a controller 60. The vibration sensor 30' can be disposed on a bottom surface of the touch interface 20', or at any position of the touch-controlled end product. The vibration sensor 30' is configured to detect a vibration signal generated by a tap operation performed to the touch interface 20'. The touch interface 20' is configured to sense the tap operation to obtain a plurality of touch sensing values which are then transformed into an image. The controller 60 is coupled to the touch interface 20' and the vibration sensor 30' and receives the image formed by the touch sensing values generated by the touch interface 20' and the vibration signal generated by the vibration sensor 30'. The touch sensing values from the touch interface 20' can be transformed into the image by the controller 60.

The controller 60 is configured to perform classification prediction for a tap event made by a user on the touch interface 20' to obtain a predicted tap type. For example, a deep neural network identical to or corresponding to the deep neural network adopted in Steps S61 to S64 is deployed in the controller 60, and the optimized weighting parameter group obtained from Step S64 is stored in the controller 60. The corresponding deep neural network and the optimized weighting parameter group construct a model. The controller 60 inputs the vibration signal from the vibration sensor 30' and the image formed by the touch sensing values from the touch interface 20', into the model to obtain the predicted tap type. In such a way, the touch-controlled end product achieves classification prediction for the tap events.

In an embodiment, the controller 60 can be any controller of the touch-controlled end product. In another embodiment, the controller 60 may be integrated into a touch control chip. That is, the touch control chip of the touch-controlled end product carries out not only sensing user touch operations but also predicting user tap types. Specifically, program codes corresponding to the deep neural network and the optimized weighting parameter group may be stored in firmware of the touch control chip. In executing a driver, the touch control chip can predict types of the tap events.

Figure 9:
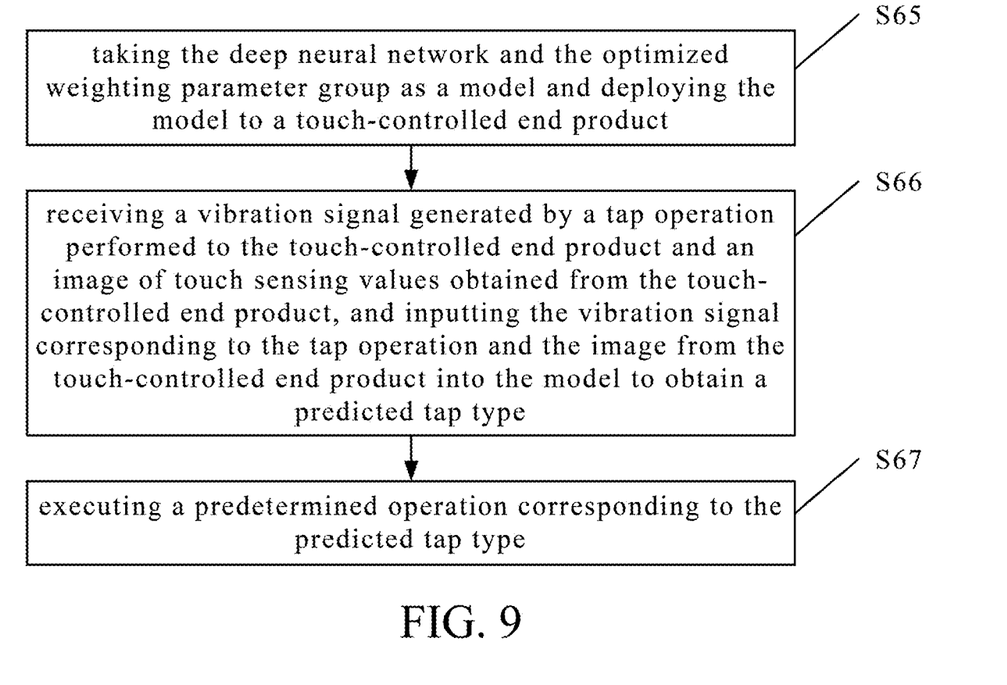
FIG. 9 is a flowchart of a method for identifying tap events on a touch panel according to the second embodiment of the present disclosure.

Referring to FIG. 9 with reference to FIG. 6, the method further includes the following steps.

Step S65—taking the deep neural network and the optimized weighting parameter group as a model and deploying the model to a touch-controlled end product. In this step, the touch-controlled end product has a prediction model, which includes a deep neural network identical to or corresponding to the deep neural network adopted in Steps S61 to S64 and the optimized weighting parameter group obtained from Step S64.

Step S66—receiving a vibration signal generated by a tap operation performed to the touch-controlled end product and an image of touch sensing values obtained from the touch-controlled end product, and inputting the vibration signal corresponding to the tap operation and the image from the touch-controlled end product into the model to obtain a predicted tap type. In this step, when a user taps the touch-controlled end product, the vibration sensor 30' of the touch-controlled end product obtains a measured vibration signal and the touch interface 20' generates touch sensing values which are then transformed into an image. The vibration signal and the image are inputted to the model to predict the type of the tap operation.

Step S67—executing a predetermined operation corresponding to the predicted tap type. In this step, the controller 60 can transmit the predicted tap type to a software application running in an operating system and the software application can perform an operation corresponding to the predicted result.

In an exemplary application scenario, a marking software is installed on a large-sized touch display product. For instance, when a user makes a tap using one single finger on a surface of the product, the marking software correspondingly opens or closes a main menu. For a tap using two fingers, the marking software changes a brush color. For a tap using three fingers, the marking software changes a brush size. In another exemplary application scenario, when a user makes a 90-degree tap, a main menu is opened or closed. For a 45-degree tap, a menu item is highlighted for the user to select plural items or to select text. In another example, when playing a video or music, the one-time tap made by the user at a lateral surface of a touch pad may stop playing and the two-time tap may resume the playing.

In the present disclosure, deep learning with the deep neural network is adopted to classify various tap events on the touch panel to obtain a prediction model. The prediction model is deployed in the touch-controlled end product. Accordingly, the touch-controlled end product can predict types of tap motions made by users, and carry out various applications for these tap types in software applications and thus greatly improve applicability. In addition, the vibration signal and the image formed by the touch sensing values that are generated due to the tap are used together to predict tap type in the present disclosure, thereby effectively improving accuracy of prediction on the tap type.

While the preferred embodiments of the present disclosure have been illustrated and described in detail, various modifications and alterations can be made by persons skilled in this art. The embodiment of the present disclosure is therefore described in an illustrative but not restrictive sense. It is intended that the present disclosure should not be limited to the particular forms as illustrated, and that all modifications and alterations which maintain the spirit and realm of the present disclosure are within the scope as defined in the appended claims.

The invention claimed is:

1. A method for identifying tap events on a touch panel, comprising:
    detecting various tap events on the touch panel to obtain a plurality of measured vibration signals and recording types of the tap events as classification labels;
    taking the vibration signal and the classification label that correspond to one of the tap events as a sample, and generating a sample set comprising a plurality of samples;
    taking the samples of the sample set as inputs and a freely-selected weighting parameter group as adjusting parameters and inputting them into a deep neural network for training the deep neural network by adjusting the weighting parameter group by way of a backpropagation algorithm;
    taking out the samples of the sample set in batches to train the deep neural network and fine tune the weighting parameter group to determine an optimized weighting parameter group;
    taking the deep neural network and the optimized weighting parameter group as a model and deploying the model to a touch-controlled end product;
    detecting a vibration signal generated by a tap operation performed to the touch-controlled end product and generating an image formed by a plurality of touch sensing values corresponding to the tap operation; and
    inputting the vibration signal corresponding to the tap operation into the model to obtain a first result and analyzing the image formed by the touch sensing values to obtain a second result, and obtaining a predicted tap type based on the first result and the second result.

2. The method according to claim 1, wherein after the step of obtaining the predicted tap type, the method further comprises:
    executing a predetermined operation corresponding to the predicted tap type.

3. The method according to claim 2, wherein the predetermined operation is selected from a group consisting of opening or closing a menu, changing a brush color, and changing a brush size.

4. The method according to claim 1, wherein types of taps are classified by at least one of the number of taps, the number of fingers simultaneously conducting a tap, a portion of a finger conducting the tap, and a tapping angle.

5. The method according to claim 1, wherein the deep neural network comprises a convolutional neural network.

6. A method for identifying tap events on a touch panel, comprising:
    detecting various tap events on the touch panel to obtain a plurality of measured vibration signals, using the touch panel to detect each of the tap events to obtain a plurality of touch sensing values and transforming the touch sensing values into an image, and recording types of the tap events as classification labels;
    taking the vibration signal, the image, and the classification label that correspond to one of the tap events as a sample, and generating a sample set comprising a plurality of samples;
    taking the samples of the sample set as inputs and a freely-selected weighting parameter group as adjusting parameters and inputting them into a deep neural network for training the deep neural network by adjusting the weighting parameter group by way of a backpropagation algorithm; and
    taking out the samples of the sample set in batches to train the deep neural network and fine tune the weighting parameter group to determine an optimized weighting parameter group.

7. The method according to claim 6, wherein the step of training the deep neural network comprises:
    inputting features of the vibration signal corresponding to one of the tap events into a first sub network which is a one-dimensional sub network;
    inputting features of the image corresponding to the touch sensing values of one of the tap events into a second sub network which is a two-dimensional sub network;
    inputting an output of the first sub network and an output of the second sub network into a flat layer for data flattening to transform the outputs of the first sub network and the second sub network into one-dimensional data; and
    inputting an output of the flat layer into a multi-layer perceptron to perform classification prediction for the tap events.

8. The method according to claim 7, wherein the first sub network and the second sub network comprise a convolutional neural network.

9. The method according to claim 6, wherein the step of transforming the touch sensing values into the image comprises:
transforming the touch sensing values which correspond to a local area where the tap event is located at, into the image.

10. The method according to claim 6, further comprising:
taking the deep neural network and the optimized weighting parameter group as a model and deploying the model to a touch-controlled end product; and
receiving a vibration signal generated by a tap operation performed to the touch-controlled end product and an image of touch sensing values obtained from the touch-controlled end product, and inputting the vibration signal corresponding to the tap operation and the image from the touch-controlled end product into the model to obtain a predicted tap type.

11. The method according to claim 10, wherein after the step of obtaining the predicted tap type, the method further comprises:
executing a predetermined operation corresponding to the predicted tap type.

12. The method according to claim 11, wherein the predetermined operation is selected from a group consisting of opening or closing a menu, changing a brush color, and changing a brush size.

13. The method according to claim 6, wherein types of taps are classified by at least one of the number of taps, the number of fingers simultaneously conducting a tap, a portion of a finger conducting the tap, and a tapping angle.

14. A system for identifying tap events on a touch panel, comprising:
a touch panel;
a vibration sensor, deployed with the touch panel, wherein the vibration sensor is configured to detect various tap events on the touch panel to obtain a plurality of measured vibration signals, and the touch panel is configured to detect each of the tap events to obtain a plurality of touch sensing values and the touch sensing values are transformed into an image;
a processor coupled to the vibration sensor and the touch panel, configured to receive the vibration signals transmitted from the vibration sensor and a plurality of images transmitted from the touch panel; and
a memory, connected to the processor, the memory comprising a plurality of program instructions executable by the processor, the processor executing the program instructions to perform a method comprising:
recording types of the tap events as classification labels in the memory;
taking the vibration signal, the image, and the classification label that correspond to one of the tap events as a sample, and generating a sample set comprising a plurality of samples;
taking the samples of the sample set as inputs and a freely-selected weighting parameter group as adjusting parameters and inputting them into a deep neural network for training the deep neural network by adjusting the weighting parameter group by way of a back-propagation algorithm; and
taking out the samples of the sample set in batches to train the deep neural network and fine tune the weighting parameter group to determine an optimized weighting parameter group.

15. The system according to claim 14, wherein the deep neural network comprises:
a first sub network, configured to receive features of the vibration signal corresponding to one of the tap events, wherein the first sub network is a one-dimensional sub network;
a second sub network, configured to receive features of the image corresponding to the touch sensing values of one of the tap events, wherein the second sub network is a two-dimensional sub network;
a flat layer, configured to flatten an output of the first sub network and an output of the second sub network to transform the outputs of the first sub network and the second sub network into one-dimensional data; and
a multi-layer perceptron, configured to receive an output of the flat layer to perform classification prediction for the tap events to obtain a predicted classification label.

16. The system according to claim 15, wherein the first sub network and the second sub network comprise a convolutional neural network.

17. The system according to claim 14, wherein the method further comprises:
transforming the touch sensing values which correspond to a local area where the tap event is located at, into the image.

18. The system according to claim 14, wherein types of taps are classified by at least one of the number of taps, the number of fingers simultaneously conducting a tap, a portion of a finger conducting the tap, and a tapping angle.

19. A touch-controlled end product, comprising:
a touch interface;
a vibration sensor, deployed with the touch interface, the vibration sensor configured to detect a vibration signal generated by a tap operation performed to the touch interface configured to sense the tap operation to obtain a plurality of touch sensing values which are then transformed into an image; and
a controller coupled to the vibration sensor and the touch interface, wherein a deep neural network corresponding to the deep neural network according to claim 14 is deployed in the controller, and the controller is configured to take the corresponding deep neural network and the optimized weighting parameter group obtained according to claim 14 as a model and input the vibration signal corresponding to the tap operation and the image from the touch interface into the model to obtain a predicted tap type.

20. The touch-controlled end product according to claim 19, wherein the controller is further configured to execute a predetermined operation corresponding to the predicted tap type.

* * * * *